(No Model.)
P. WHITE.
WATER CLOSET.
No. 357,803. Patented Feb. 15, 1887.
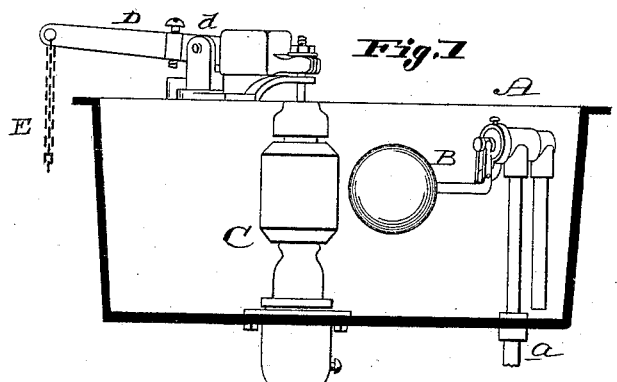
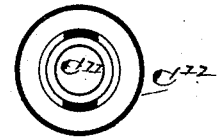
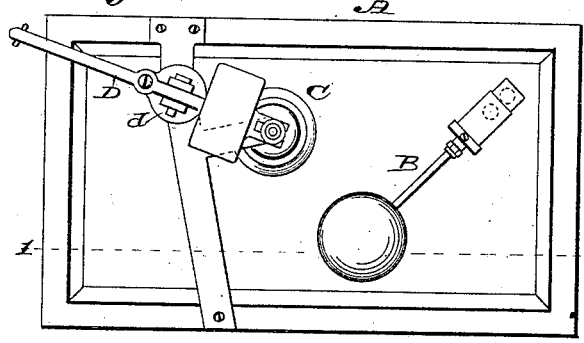
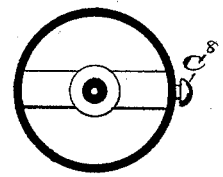
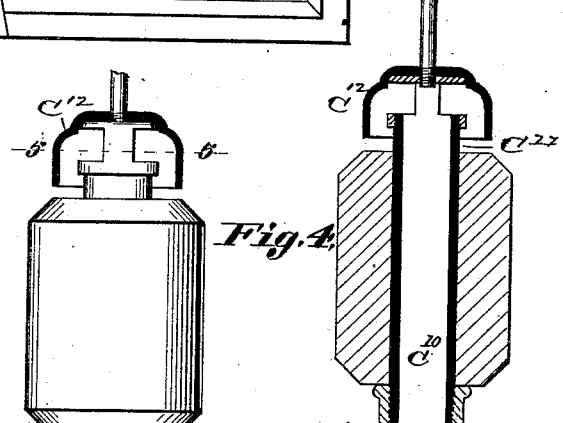
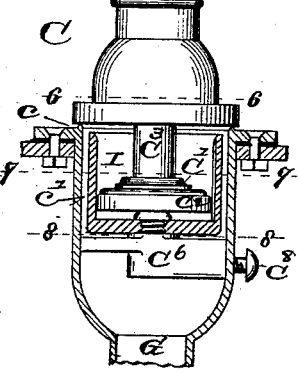
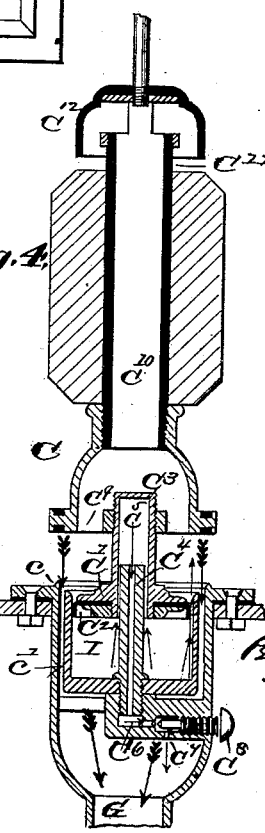
Attest:
Charles Pickles
J. W. Hoke
A. K. Fassitt
Inventor
Peter White
by C. D. Moody
atty
N. PETERS, Photo-Lithographer, Washington, D. C.

UNITED STATES PATENT OFFICE.

PETER WHITE, OF ST. LOUIS, MISSOURI.

WATER-CLOSET.

SPECIFICATION forming part of Letters Patent No. 357,803, dated February 15, 1887.

Application filed January 22, 1885. Serial No. 153,678. (No model.)

*To all whom it may concern:*

Be it known that I, PETER WHITE, of St. Louis, Missouri, have made a new and useful Improvement in Water-Closets, of which the following is a full, clear, and exact description.

The improvement relates to what are termed "tank" water-closets; and it consists in the means employed in effecting the gradual closing of the valve which is used in discharging the water from the tank.

The annexed drawings, making part of this specification, illustrate the improvement.

Figure 1 is a vertical section taken through the tank. Fig. 2 is a plan of the tank. Fig. 3 is a view, upon an enlarged scale, showing the tank-valve partly in elevation and partly in section, the valve being seated. Fig. 4 is a vertical section of the tank-valve, the valve being unseated. Fig. 5 is a horizontal section on the line 5 5 of Fig. 3. Fig. 6 is a horizontal section on the line 6 6 of Fig. 3. Fig. 7 is a horizontal section on the line 7 7 of Fig. 3. Fig. 8 is a horizontal section on the line 8 8 of Fig. 3.

The same letters of reference denote the same parts.

The water is let into the tank A through the supply-pipe $a$, and the inflow is regulated by a ball-valve, B, of the customary type. The outflow from the tank is controlled by means of the valve C, which is adapted to be unseated by means of the lever D and chain E, Figs. 1 and 2. The lever turns upon the fulcrum $d$ and the chain leads from the lever D to the closet-trunk mechanism. (Not here shown.) By drawing the chain downward the tank-valve C is raised from its seat $c$, Figs. 3, 4, and the water flows from the tank into the pipe G, which leads to the water-closet bowl. (Not shown.)

The construction of the tank-valve C and the means therewith immediately associated for controlling the closing of the tank-valve will now be described.

Within the seat $c$, and somewhat smaller in diameter than the seat, so as to form a water-passage, $c'$, between the two parts, is a chamber, I, that is open at the upper end to admit the water of the tank. The valve C is provided with a plunger, C', having a cup-leather valve, $C^2$, that is turned downward and fitted to work in the chamber I. When the valve C is unseated, as in Fig. 4, the water flows from the tank A through the annular passage $c'$, and past the chamber I into the pipe G, as indicated by the feathered arrows in Fig. 4. Water also flows past the cup-leather $C^2$ into the chamber I beneath the plunger C'. The stem $C^3$ of the plunger C' is made hollow, to admit a tube, $C^4$, which projects upward from the bottom of the chamber and fits loosely in the plunger-stem $C^3$, and with its other function serves as a guide on which said stem $C^3$ moves. As the valve C closes to its seat the water within the chamber I is forced thence, by reason of the plunger C' and cup-leather $C^2$ descending within the chamber I, as represented in Fig. 3, upward around the tube $C^4$, and between the tube and the plunger-stem $C^3$, and into the space $C^5$ within the plunger-stem above the tube $C^4$. The water thence passes downward through the tube $C^4$ into a chamber, $C^6$, beneath the tube, and thence through the orifice $C^7$ into the pipe G. As the valve C cannot seat until the water is mainly forced, in the manner described, from the chamber I, and as the passage from the chamber to the pipe G is a restricted one, substantially as shown, the valve is necessarily seated gradually. The flow from the orifice $C^7$ is graduated by means of the adjustable plug $C^8$. The valve C is chambered out around the plunger-stem $C^3$, substantially as shown at $C^9$, Fig. 4, and from the space $C^9$ a passage, $C^{10}$, leads upward through the stem $C^{11}$ of the valve to the trap $C^{12}$. The water within the valve C can thus escape upward through the valve, and thence back into the tank again.

I claim—

1. The combination of the tank A, the seat $c$, the chamber I, the valve C, connected by tube $C^4$ with the plunger C', said plunger being provided with the cup-leather $C^2$, the stem $C^3$, fitting loosely on the guide-tube $C^4$, and the chamber $C^6$, having the orifice $C^7$, provided with the adjustable plug $C^8$, substantially as described.

2. The combination of the tank A, the seat $c$, the valve C, having the hollow stem $C^{11}$, the plunger C', having the cup-leather $C^2$, the hollow stem $C^3$, the guide tube $C^4$, fitting loosely in the said stem $C^3$, and the chamber $C^6$, having the orifice $C^7$, all constructed and operating as described.

Witness my hand this 23d December, 1884.

PETER WHITE.

Witnesses:
C. D. MOODY,
J. W. HOKE.